Dec. 26, 1967  R. K. ROYCE  3,360,723
DIGITAL VOLTAGE INTEGRATOR SYSTEM
Filed Aug. 28, 1964  4 Sheets-Sheet 1

INVENTOR
RICHARD K. ROYCE
BY
ATTORNEY

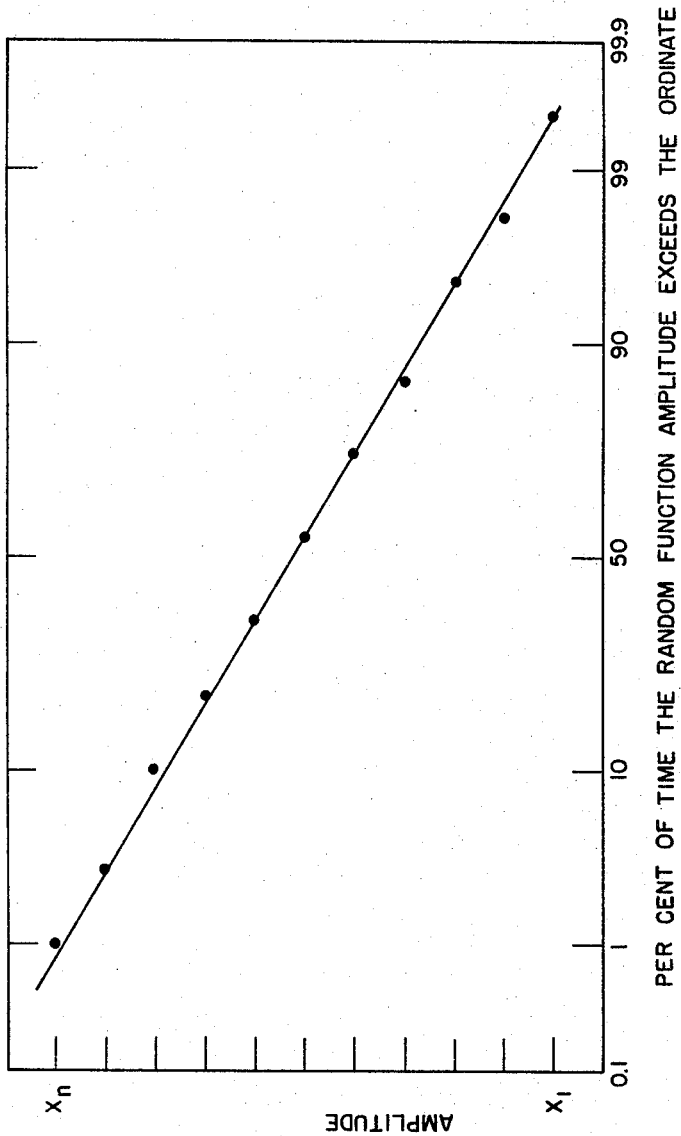

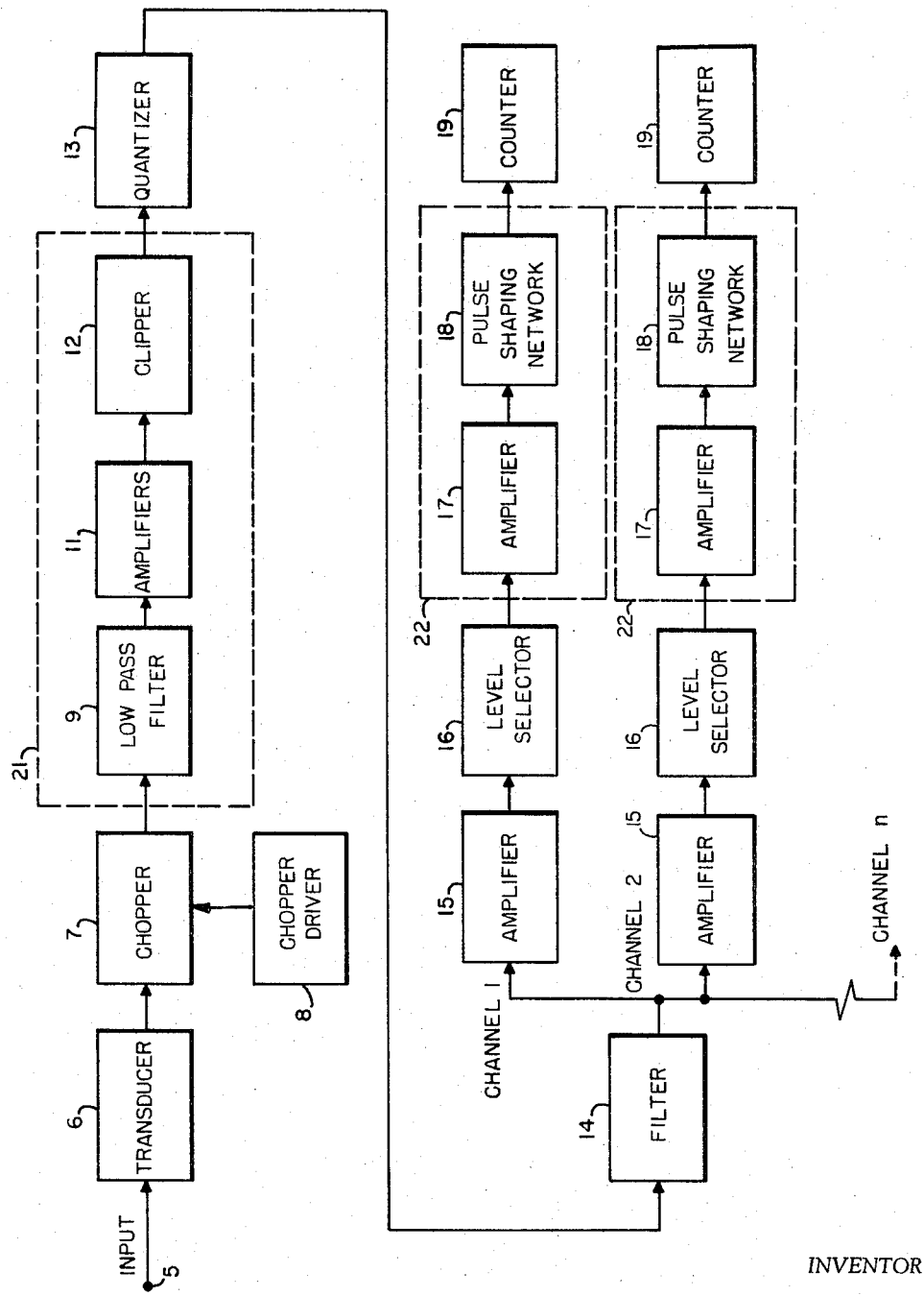

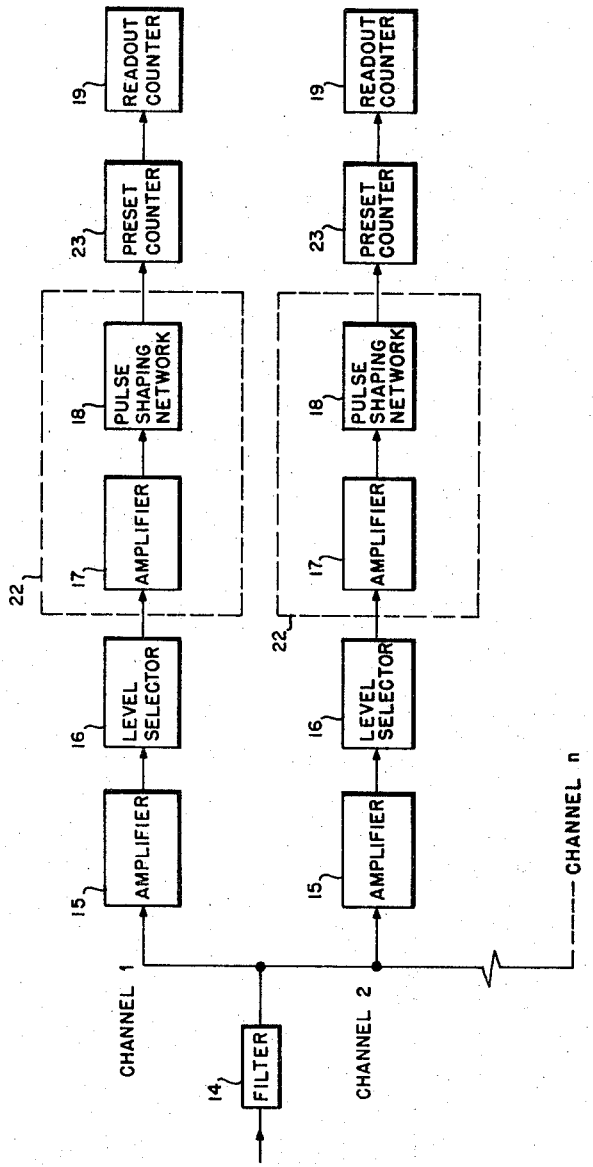

United States Patent Office 3,360,723
Patented Dec. 26, 1967

1

3,360,723
DIGITAL VOLTAGE INTEGRATOR SYSTEM
Richard K. Royce, Alexandria, Va., assignor to the United States of America as represented by the Secretary of the Navy
Filed Aug. 28, 1964, Ser. No. 392,972
8 Claims. (Cl. 324—77)

The invention described herein may be manufactured and used by or for the Government of the United States of America for governmental purposes without the payment of any royalties thereon or therefor.

The invention relates generally to a digital integration system and in particular to a digital integration system for statistically analyzing a random function.

Previous methods and devices for statistically analyzing a random function have proven inadequate due to the lack of facility and accuracy in the techniques employed. The techniques also have been laborious and time consuming since the data obtained in real time was not in a readily usable form.

The general purpose of this invention is to provide a digital integration system for automatically measuring in real time either the amplitude probability density or the cumulative amplitude distribution of any random function. By means of this invention the amplitude probability density or cumulative amplitude distribution of a random function can be quickly, easily, and accurately determined.

It is therefore an object of the present invention to provide a new and improved digital voltage integrator which, for a given number of channels, overcomes the inadequacies of the prior art, has improved response with respect to higher frequency components in the random function, is less expensive than past systems for the greater accuracy and analysis time saved, and is no more complex for the improvements attained.

Another object of the invention is the provision of generally improved operational characteristics in a voltage amplitude integration system.

A further object is to provide a highly efficient, accurate, and reliable digital integration system.

Still another object is to provide a digital voltage integration system for automatically measuring in real time either the amplitude probability density or the cumulative amplitude distribution of any random function.

Other objects and many of the attendant advantages of this invention will be readily appreciated as the same becomes better understood by reference to the following detailed description when considered in connection with the accompanying drawings wherein:

FIG. 3 is a plot of the cumulative amplitude distribution measurement expressed as amplitude vs. percent of time the function to be analyzed exceeds the ordinate amplitude;

FIG. 4 is a block diagram of the invention; and

FIG. 5 is a block diagram showing a modified portion of the invention.

Figure 1:
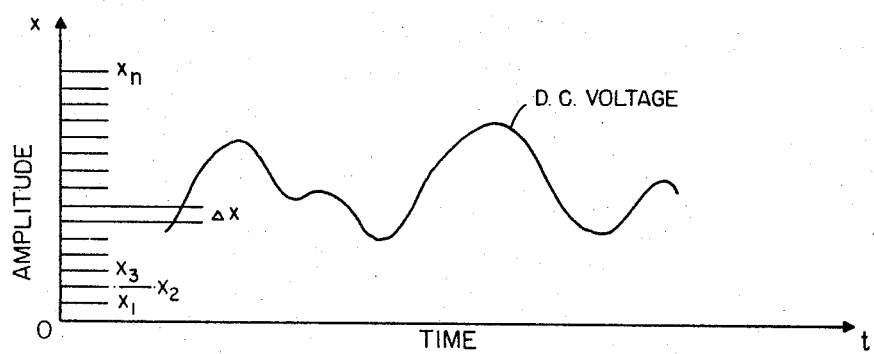
FIG. 1 is an illustration of a typical D.C. voltage input having amplitude vs. time characteristics proportional to the random function to be analyzed.

Referring now to the drawings, there is shown in FIG. 1 a typical varying D.C. voltage input which is applied to the chopper input of the digital integration system for measurement of its amplitude probability density. This D.C. voltage is proportional to the random function to be analyzed. Measurement of the typical D.C. voltage can be made statistically by superimposing on the waveform a grid of $n$ number of horizontal lines, $x_1$ to $x_n$, forming $n$ amplitude intervals. By integrating separately

2 the length of time that the D.C. voltage amplitude remained within each of the $\Delta x$ intervals during the sampling period, a measured probability density function can be obtained. $\Delta x$ represents the voltage interval between any two horizontal lines.

Figure 2:
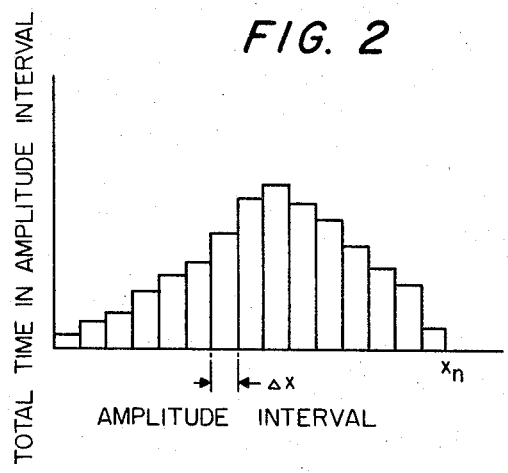
FIG. 2 is a plot of an experimental amplitude probability density measurement.

FIG. 2 illustrates the probability density measurement of the varying D.C. input signal of FIG. 1 obtained by integrating separately the length of time that the D.C. voltage amplitude remained within the intervals during the sampling period. The probability density measurement is a plot of the total time in the amplitude interval vs. the amplitude intervals.

FIG. 3 shows a typical experimental cumulative amplitude distribution measurement expressed as the percent of time the amplitude of the input function exceeded the ordinate amplitude. It is a plot of amplitude vs. percent of time.

Referring now to FIG. 4, which illustrates a schematic block diagram of the digital integration system, there is shown a transducer 6 for receiving a randomly varying function at input 5 and for producing at its output a varying D.C. voltage proportional to the random function. The transducer may be any device for converting the random function to be analyzed into a varying D.C. voltage. It may be a device for converting mechanical motions into a varying D.C. voltage. In some applications the transducer may be omitted from the system since the signal is already of a form which can be readily received by the chopper 7. The D.C. voltage received by chopper 7 may contain frequency components to $\frac{1}{3}f$, where $f$ is the chopping rate in cycles per second, and may be positive or negative. However it must have a low impedance source of approximately 100 ohms or less. The D.C. signal is chopped in chopper 7 which is driven by chopper driver 8. Chopper driver 8 is an oscillator which causes the output of the chopper 7 to consist of pulses occurring at a rate of $f$ c.p.s. and whose amplitudes are proportional to the varying D.C. voltage input. The output of the chopper 7 is processed in a signal processing circuit 21, which comprises a low pass filter 9, A.C. amplifiers 11, and clipper 12, before arriving at the input of quantizer 13. Filter 9 is a low pass filter whose response is flat to at least $\frac{4}{3}f$ and attenuates rapidly thereafter. The A.C. amplifiers 11 provide suitable voltage and power amplification through a plurality of transformer coupled stages (not shown). Clipper circuit 12 of the first signal processing circuit 21 is a conventional clipper and is used to remove the positive portion of the power amplifier output pulses. The positive portion is removed since the quantizer 13 is designed to operate on negative signals. The output of low pass filter 9 is coupled to the input of A.C. amplifiers 11 and the output of amplifiers 11 is in turn coupled to the input of clipper circuit 12 as shown in FIG. 4.

The output pulses of signal processing circuit 21, which are proportional to the varying D.C. input are applied to voltage quantizer 13 which has a frequency response to at least $\frac{4}{3}f$. The quantizer 13 produces one output pulse for each input pulse. Each of the quantizer output pulses is an up and down staircase of $n$ possible number of discrete amplitudes. The quantizer is a conventional circuit for converting a signal having a continuous range of signal amplitudes into one having a finite number of discrete values. The relationship of the quantizer output pulses to the varying D.C. voltage input to the system is such that for an initial input interval $x_{1 \to 2}$, the output pulses of the quantizer have an amplitude V, with each of these pulses being a one step pulse. Then for the next input interval $x_{2 \to 3}$ the output pulses of the quantizer have an amplitude 2V and each of these pulses is a two step pulse. In general, for a D.C. voltage input to the digital integration system in the interval $x_{n \to (n+1)}$ the output pulses of the quantizer will have an amplitude $n$V and each of these pulses is an $n$ step pulse. The discrete amplitude output pulses of the quantizer 13 are applied to $n$ number of amplifiers 15 through a filter 14. The $n$ number of amplifiers 15 have their inputs connected in parallel to the output of filter 14. The amplifiers 15 provide a suitable amplification, K, and $n$ separate but identical channels of the discrete amplitude pulses. The output of each of the amplifiers 15 is coupled to one of the $n$ number of voltage level selectors 16 in the corresponding channel. The voltage level selector circuits may be any form of conventional threshold-type circuits which are non-critical with respect to drift since the amplitude selection is performed on a step function pulse on the rising portion of the step. In the simplest configuration, the level selector may be a diode coupled to a variable voltage source. The voltage source is set at a predetermined level so that signals above that level will be passed by the circuit. If it is desired to define a voltage interval rather than a voltage level, and to pass signals within that interval, then two such circuits may be used—one to set the lower limit voltage, and the other to set the upper limit voltage.

In one method of operation, voltage level selector circuits 16 will operate so that the selector of channel 1 passes only those pulses with an amplitude greater than or equal to KV, level selector 16 of channel 2 passes only those pulses with the amplitude greater than or equal to 2KV, and so on. In general, level selector 16 of channel $n$ will pass only those pulses greater than or equal to $n$KV. With this method of operation, the readout from the pulse counters 17 is proportional to the integral of the amplitude probability density function. This measurement is called the cumulative amplitude distribution function. A typical experimental cumulative amplitude distribution measurement is shown in FIG. 3, and is expressed as the percent of time the amplitude of the random function exceeded the ordinate amplitude.

Each of the level selector outputs is coupled to a respective one of $n$ number of second signal processing circuits 22, each of which consists of a voltage amplifier circuit 17 serially connected to a pulse shaping network 18 as shown in FIG. 4. The second signal processing circuit 22 provides uniform pulse outputs from the voltage level selector circuits 16 to a pulse counter 19 in its respective channel.

Each of the pulse counters 19 is connected to the pulse shaping network 18 of its respective second signal processing circuit 22. There is therefore a respective pulse counter for each of the channels so that the pulses from each of the $n$ level selector channels are counted during the sampling period over which the random function is to be measured. The total pulse count in a given channel is proportional to the length of time the random function had an amplitude above a given voltage level. Each of the counters 19 may be a plurality of counters.

If it is desired to have the counters 19 readout directly in percent of time a given amplitude is exceeded, preset counters 23 are used as dividers ahead of the readout counters 19 as shown in FIG. 5. If the chopping rate is $f$ c.p.s., and the duration of the sampling period over which the random function to be measured is $t$ seconds, then the number N which must be preset in the preset counter is expressed by the formula $$N = \frac{(f)(t)}{0.1(10^x)}$$

where $x$ is the number of digit places in the readout. For example, if a percent of time readout of four places (0000) is desired on the readout counters, then $$N = \frac{(f)(t)}{1000}$$

Where a plurality of counters are employed for each of the counters 19, some of those counters can be preset counters for the direct readout operation indicating the percent of time a given amplitude is exceeded. The readouts from counters 19 may therefore be used directly to plot the cumulative amplitude distribution function shown in FIG. 3.

In another method of operation, voltage selectors 16 will operate so that the first selector circuit passes all pulses between voltage levels KV and 2KV, selector circuit 16 of channel 2 will pass pulses between 2KV and 3KV, and so on. In other words a particular voltage selector will pass all pulses within predetermined voltage levels. The readout from the pulse counters may be used to plot the amplitude probability density measurement as shown in FIG. 2, since each counter output will indicate a number proportional to the length of time the random function had an amplitude within a given amplitude interval. Preset counters may be employed here to obtain a readout directly in units of time (seconds, minutes, etc.).

It is apparent then that the system can be readily used to give two forms of measurement depending upon the biasing arrangement employed in the level selector circuits 16. If the biasing arrangement provides both an upper and lower limit in each level selector, thereby defining an amplitude interval, then the output measurement as determined from the counters will indicate the amount of time that the random input function was in a particular amplitude interval as shown in FIG. 2. On the other hand, if the biasing arrangement is such that each level selector passes all pulses above a preset voltage bias level, then the output measurement will be expressed in terms of a cumulative amplitude distribution function as shown in FIG. 3. Both measurements can be made in real time.

This invention may be used to statistically measure any randomly varying function which can be converted to an equivalent voltage function. An important use for this invention is in the statistical study of radio wave propagation. In that application, the automatic gain control voltage from a receiver is directly used as the input to the chopper 7 without the use of transducer 6 since the A.G.C. voltage is proportional to the R.F. energy received by the receiver antenna. If a measurement in real time and speed of measurement are not factors of concern in a statistical study, the input to the digital integration system can be obtained through a loop tape source. If this type of input source is employed, each voltage amplitude interval may be measured successively by the use of a single pulse counter and only a single level selector channel following filter 14. Otherwise it is necessary to utilize $n$ number of pulse counters in each of $n$ channels to obtain a complete and accurate amplitude probability density measurement of the random function.

Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. A digital integration system for automatically statistically analyzing a random function over a sampling period by analyzing a varying D.C. input signal proportional to said random function comprising:

means for receiving said input signal and producing a series of evenly spaced ouput pulses having continuously variable amplitudes proportional to corresponding evenly spaced portions of said random function;

quantizing means coupled to said receiving means for producing a series of evenly spaced quantized pulses having a number of discrete amplitudes, each of said quantized pulses corresponding to a respective one of said output pulses and each said discrete amplitudes having a unique one-to-one correspondence to a predetermined amplitude range of said output pulses;

level selector means coupled to said quantizing means to receive said series of evenly spaced quantized pulses to produce a pulse signal in a first channel whenever the amplitude of a quantized pulse is greater than or equal to a first given level and to produce a pulse signal in a second channel whenever the amplitude of a quantized pulse is greater than or equal to a second given level; and at least two pulse counter means coupled to said selector means for separately counting the pulses in said channels.

2. The digital integration system of claim 1 wherein the receiving means comprises chopper means.

3. The digital integration system of claim 2 wherein the receiving means includes an oscillator coupled to said chopper means for driving said chopper means at a given frequency.

4. The digital integration system of claim 1 wherein each said counter means includes at least one preset counter as well at least one readout counter.

5. A digital integration system for automatically statistically analyzing a randomly varying input signal over a sampling period comprising:

means for receiving said input signal and producing a series of evenly spaced output pulses having continuously variable amplitudes proportional to corresponding evenly spaced portions of said input signal;

quantizing means coupled to said receiving means for producing a series of evenly spaced quantized pulses having a finite number of discrete amplitudes, each of said quantized pulses corresponding to a respective one of said output pulses and each said discrete amplitudes having a unique one-to-one correspondence to a predetermined amplitude range of said ouput pulses;

level selector means coupled to said quantizing means to receive said series of evenly spaced quantized pulses to produce a pulse signal in at least one of a plurality of separate channels whenever the amplitude of a quantized pulse is within the amplitude range corresponding to that channel; and pulse counter means including a plurality of readout counters equal in number to said separate channels and connected individually to the respective channels.

6. The digital integration system of claim 5 wherein the receiving means comprises chopper means.

7. The digital integration system of claim 6 wherein the receiving means includes an oscillator coupled to said chopper means for driving said chopper means at a given frequency.

8. The digital integration system of claim 5 wherein said counter means includes at least one preset counter in addition to the said plurality of readout counters.

References Cited

UNITED STATES PATENTS

| | | |
|---|---|---|
| 2,541,039 | 2/1951 | Cole. |
| 2,702,367 | 2/1955 | Ergen _____ 324—68 |
| 2,774,535 | 12/1956 | Anderson. |
| 2,927,207 | 3/1960 | Fiehrer et al. _____ 328—151 |
| 3,054,960 | 9/1962 | Pearlman _____ 324—103 X |

OTHER REFERENCES

"A Pulse Ammeter" article from Instruments TID–4500, by J. J. Newman, pp. 11–13, 1961.

Electronics for Scientists Malmstadt and Enke, Benjamin Inc., New York, 1962, pp. 266–269 and 360–361.

RUDOLPH V. ROLINEC, *Primary Examiner.*

WALTER L. CARLSON, *Examiner.*

P. F. WILLE, *Assistant Examiner.*